(12) United States Patent
Doi (10) Patent No.: US 7,819,535 B2
(45) Date of Patent: Oct. 26, 2010

(54) PROJECTION APPARATUS AND COVER GLASS ATTACHING STRUCTURE

(75) Inventor: Naohito Doi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 805 days.

(21) Appl. No.: 11/716,969

(22) Filed: Mar. 12, 2007

(65) Prior Publication Data

US 2007/0216873 A1    Sep. 20, 2007

(30) Foreign Application Priority Data

Mar. 15, 2006  (JP) ............................... 2006-071224

(51) Int. Cl.
G03B 21/14  (2006.01)
B60Q 3/04   (2006.01)
H01J 40/14  (2006.01)
(52) U.S. Cl. .................... 353/119; 362/362; 250/239
(58) Field of Classification Search ............ 353/97, 353/56, 119, 22, 100, 72, 42, 122; 362/294, 362/293, 362, 373, 364; 352/242; 250/239
See application file for complete search history.

(56) References Cited

U.S. PATENT DOCUMENTS

| 6,874,894 | B2 |  | 4/2005 | Kitamura |  |
| 7,344,257 | B2 | * | 3/2008 | Terashima et al. | 353/102 |
| 7,358,657 | B2 | * | 4/2008 | Koelger et al. | 313/113 |
| 7,625,106 | B2 | * | 12/2009 | Fujii et al. | 362/373 |
| 2002/0039174 | A1 |  | 4/2002 | Yamada et al. |  |
| 2004/0228130 | A1 |  | 11/2004 | Kato et al. |  |
| 2005/0219480 | A1 |  | 10/2005 | Yano |  |
| 2006/0279711 | A1 | * | 12/2006 | Yoshii et al. | 353/97 |

FOREIGN PATENT DOCUMENTS

| EP | 1 542 460 A1 | 6/2005 |
| JP | 11-237691 | 8/1999 |
| JP | 3092509 | 12/2002 |
| JP | 3104472 | 7/2004 |
| JP | 2004-239975 | 8/2004 |

(Continued)

OTHER PUBLICATIONS

European Search Report for European Application No. 07005204.8-2209, dated Jun. 14, 2007 (5 pages).

(Continued)

*Primary Examiner*—Que T Le
*Assistant Examiner*—Pascal M Bui-Pho
(74) *Attorney, Agent, or Firm*—Osha Liang LLP (57) ABSTRACT

A projection apparatus includes a light source unit. The light source unit includes a light source, a cover glass that transmits light emitted from the light source, and a case that holds the light source and the cover glass. The projection apparatus forms and projects an image using the light exiting the light source unit. The case includes a front case made of metal that covers a front of the light source and an insulating member that is attachable to an inner side of the front case. The front case and the insulating member each include an opening that allows light emitted from the light source to exit and a fitting portion into which the cover glass is fitted, the fitting portion being provided around the opening.

4 Claims, 6 Drawing Sheets

FOREIGN PATENT DOCUMENTS

| | | |
|---|---|---|
| JP | 2005-149841 | 6/2005 |
| JP | 2005-196230 | 7/2005 |

OTHER PUBLICATIONS

Patent Abstracts of Japan for Japanese Publication No. 11237691, Publication date Aug. 31, 1999 (1 page).

Patent Abstracts of Japan for Japanese Publication No. 2005196230, Publication date Jul. 21, 2005 (1 page).

Patent Abstracts of Japan for Publication No. 2004-239975, Publication date Aug. 26, 2004 (1 page).

Patent Abstracts of Japan for Publication No. 2005-149841, Publication date Jun. 9, 2005 (1 page).

* cited by examiner

PROJECTION APPARATUS AND COVER GLASS ATTACHING STRUCTURE

BACKGROUND OF THE INVENTION

1. Field of the Invention

The present invention relates to a projection apparatus that forms and projects an image by light emitted from a light source, and particularly to an attaching structure for a cover glass to a light source unit.

2. Description of the Related Art

Inside of a projection apparatus such as a projector and a rear projection television, there are provided a light source unit, an image projecting unit and the like. The light source unit is composed of a light source such as a lamp, a division-type case holding the light source, and the like. The image projecting unit is composed of an image forming device such as a DMD (Digital Micromirror Device), optical devices such as color wheel, lens and mirror, and a division-type case holding these devices, and the like. The respective cases are formed of metal so as to tolerate high heat when the light source emits light. When the light emitted from the light source exits through an opening of the case of the light source unit, and enters the case through an opening of the case of the image projecting unit, an image is formed based on the entering light and projected on a screen by the image forming device and the optical devices.

Among the projection apparatuses, there is a projection apparatus in which in order to prevent ultraviolet contained in the light of the light source from deteriorating the above-described devices of the image projecting unit or from exerting a harmful influence on a human body, a cover glass that removes the ultraviolet from the light emitted from the light source while transmitting the light is attached to the opening of the case of the light source unit, as disclosed, for example, in Patent Documents 1; Japanese Utility Model Registration No. 3092509 and Patent Document 2; Japanese Utility Model Registration No. 3104472. As an attaching structure for this cover glass, as disclosed, for example, in Patent Documents 2 described above, openings allowing the light to exit are provided in a cover plate made of sheet metal for covering a front of the light source, which is attached to a frame of a front case, and a holding plate made of sheet metal for holding the cover glass, and both the plates are joined by screws or the like to sandwich and fix the cover glass by edges of both the openings.

Also, among the projection apparatuses, there is a projection apparatus in which in order to prevent devices around a lamp from being damaged when the lamp as a light source is burst, a cover glass for preventing burst pieces of the lamp from scrambling out of a light source unit is attached to an opening of a case of the light source unit, as disclosed in Patent Documents 3, Japanese Patent Application Laid-Open No. 2004-239975, and Patent Document 4, Japanese Patent Application Laid-Open No. 2005-149841, for example. As an attaching structure for this cover glass, as disclosed, for example, in Patent Document 4, Japanese Patent Application Laid-Open No. 2005-149841, an opening allowing the light to exit is provided in an explosion-proof cover made of a metal cylinder or a heat-resisting resin cylinder, which is a part of the case covering a front of the light source, a tapered fitting portion is provided around the opening, a connecting portion to contact the cover glass is provided at an end portion of a rod-shaped electrode of the lamp, and the cover glass is inserted into the fitting portion to fix it with a heat-resisting adhesive or by a spring member and the connecting portion.

SUMMARY OF THE INVENTION

In the structure as shown in the above-described Patent Document 2, the cover glass is sandwiched and fixed between the cover plate and the holding plate made of metal, and thus, when the light source unit taken out of the projection apparatus, for example, at the time of the exchange of the light source such as the lamp drops by mistake or the like, and an impact is applied to the light source unit, there is a possibility that the impact is transmitted from both the plates, and that the cover glass is easily broken. Also, there is a possibility that at the time of damage of the light source such as burst of the lamp, a conductive member such as an electrode and a wire provided in the light source scatters forward, and comes into contact with the cover plate or the holding plate made of metal, resulting in a short circuit or electric leak. Moreover, since after the cover glass is sandwiched, and the cover plate and the holding plate are joined, the cover plate is joined to the frame of the front case to thereby attach the cover glass to the front case, the working process takes much effort and time. Furthermore, since the holding plate only for fixing the cover glass is formed of sheet metal and used, the cost is increased.

Moreover, in the above-described structure as shown in Patent Document 4, the cover glass is inserted into the fitting portion provided in the opening of the explosion-proof cover made of the heat-resisting resin cylinder, and fixed with the heat-resisting adhesive or by the connecting portion and the spring member provided in the rod-shaped electrode of the lamp, and thus, there is a possibility that when an impact by dropping or the like is applied to the light source unit, the adhesion by the adhesive unsticks or the spring member is deformed and the connecting portion bumps, so that the cover glass easily drops off or is broken. Also, since the connecting portion and the spring member need to be provided in the rod-shaped electrode of the lamp or the like so as to contact the cover glass, a general-purpose light source cannot be used, resulting in much cost.

The present invention is made to solve the above-described problems, and an object of the present invention is to provide a projection apparatus in which a cover glass can be attached to a light source unit easily and with a low cost, and breaking or dropping-off of the cover glass when an impact is applied, and a short circuit or electric leak when a light source is damaged can be prevented.

According to the present invention, in a projection apparatus which comprises a light source unit having a light source, a cover glass that transmits light emitted from the light source, and a division-type case that holds the light source and the cover glass, and forms and projects an image by the light exiting the light source unit, the projection apparatus comprises a front case made of metal that covers a front of the light source and is one component of the case, and an insulating member having an insulating property, impact absorbing property, and heat resistance that is attached to an inside of the front case, wherein openings allowing the light emitted from the light source to exit are provided in the front case and the insulating member, respectively, so as to be communicatively connected, and fitting portions into which the cover glass is fitted are provided around the openings, and the cover glass is fitted into one of the fitting portions to attach the insulating member to the front case, by which the cover glass is sandwiched and fixed by the front case and the insulating member.

With this constitution, since only by performing the fitting of the cover glass into one of the fitting portions of the front case and the insulating member and the attachment of the insulating member to the front case, the cover glass is fixed, working processes are decreased in number, labors are reduced, time is shortened, and a member only for fixing the cover glass does not need to be prepared. Therefore, the cover glass can be attached to the front case of the light source unit easily and with a low cost. Moreover, since the cover glass is sandwiched and fixed by the front case made of metal and the insulating member having the impact absorbing property and heat resistance, the impact is absorbed by the insulating member when the impact is applied to the light source unit, so that the cover glass can be prevented from being easily broken or dropping off. Additionally, the front case and the insulating member tolerate high heat when the light source emits light, which allows the fixed state of the cover glass to be stably maintained. Furthermore, since the inside of the front case is insulated by the insulating member, even if a conductive member provided in the light source scatters forward when the light source is damaged, it does not come into contact with the front case, which can prevent a short circuit or electric leak from occurring.

Moreover, according to the present invention, in each of the fitting portions of the front case and the insulating member, projected portions that support parts of end surfaces of the cover glass and recessed portions into which the projected portions of the counterpart are fitted are partially provided.

In the structure where entire end surfaces of the cover glass are supported by side walls of the fitting portion of the explosion-proof cover as in the above-described Patent Document 4, there is a possibility that fingers or the like touch the surfaces of the cover glass that transmit the light, thereby contaminating or scratching the surfaces when the cover glass is fitted into the fitting portions, so that light transmitting performance is deteriorated. However, in the case where the projected portions and the recessed portions are partially provided in the fitting portions of the front case and the insulating portion as described above, the portions of the end surfaces of the cover glass that are not supported by the projected portions of the front case can be grasped by the fingers to fit the cover glass into the fitting portion without the fingers or the like touching the surfaces of the cover glass that transmit the light. Accordingly, deterioration in light transmitting performance due to the contamination and scratching of the surfaces of the cover glass that transmit the light can be prevented. Moreover, the projected portions of the front case and the insulating member are fitted into the respective recessed portions thereof, respectively, so that wobbling of the insulating member can be suppressed, and the insulating member can be easily attached to the front case. Furthermore, the cover glass can be stably supported by the front case and the insulated member at not only the surfaces that transmit the light but the end surfaces, which can more effectively prevent the breaking and damage of the cover glass.

Furthermore, according to a typical embodiment of the present invention, in a projection apparatus which comprises a light source unit having a lamp, a plate-like cover glass that removes ultraviolet from light emitted from the lamp while transmitting the light, and a division-type case that holds the lamp and the cover glass, and forms and projects an image by the light exiting the light source unit, the projection apparatus comprises a front case made of metal that covers a front of the lamp and is one component of the case, and an insulating member made of synthetic resin having an insulating property, impact absorbing property, heat resistance, and high strength that is attached to an inside of the front case, wherein openings allowing the light emitted from the lamp to exit are provided in the front case and the insulating member, respectively, so as to be communicatively connected, and fitting portions into which the cover glass is fitted are provided around the openings, and in each of the fitting portions, a plurality of projected portions that support parts of end surfaces of the cover glass, and a plurality of recessed portions into which the projected portions of the counterpart are fitted are partially provided, and the cover glass is fitted into the fitting portion of the front case, and the respective projected portions of the front case and the insulating member are fitted into the respective recessed portions thereof to attach the insulating member to the front case, by which the cover glass is supported by the projected portions and is sandwiched and fixed by the front case and the insulating member.

With this constitution, since only by performing the fitting of the cover glass having the ultraviolet removing function into the fitting portion of the front case and the attachment of the insulating member to the front case, the cover glass is fixed, working processes are decreased in number, labors are reduced, time is shortened, and a member only for fixing the cover glass does not need to be prepared. Therefore, the cover glass can be attached to the front case of the light source unit easily and with a low cost. Particularly, since the insulating member formed of synthetic resin can be manufactured with a cost lower than that of the member formed of sheet metal, the cost can be further reduced. Moreover, since the cover glass is sandwiched and fixed by the front case made of metal and the insulating member made of synthetic resin having the impact absorbing property and heat resistance and high strength, the impact is absorbed by the insulating member when the impact is applied to the light source unit, so that the cover glass can be prevented from being easily broken or dropping off. Additionally, the front case and the insulating member tolerate high heat when the-lamp emits light, which allows the fixed state of the cover glass to be stably maintained. Furthermore, since the inside of the front case is insulated by the insulating member, even if a conductive member such as an electrode and a wire of the lamp scatters forward at the time of damage of the lamp such as burst, it does not come into contact with the front case, which can prevent a short circuit or electric leak from occurring. Furthermore, since the projected portions and the recessed portions are partially provided in the fitting portions of the front case and the insulating portion, the portions of the end surfaces of the cover glass that are not supported by the projected portions of the front case can be grasped by the fingers or the like to fit the cover glass into the fitting portion without the fingers or the like touching the surfaces of the cover glass that transmit the light. Accordingly, deterioration in light transmitting performance and ultraviolet removing performance due to the contamination and scratching of the surfaces of the cover glass that transmit the light can be prevented. Additionally, the projected portions of the front case and the insulating member are fitted into the respective recessed portions thereof, respectively, so that wobbling of the insulating member can be suppressed, and the insulating member can be easily attached to the front case. Furthermore, the cover glass can be stably supported by the front case and the insulated member at not only the surfaces that transmit the light but the end surfaces, which can more effectively prevent the breaking and damage of the cover glass.

According to the present invention, since the cover glass is sandwiched and fixed by the front case made of metal and the insulating member having the impact absorbing property and heat resistance, the cover glass can be attached to the light source unit easily and with a low cost. Also, the cover glass can be prevented from being easily broken or dropping off when an impact is applied to the light source unit, and the conductive member of the light source and the front case are insulated by the insulating member, which can prevent a short circuit or electric leak from occurring when the light source is damaged.

DESCRIPTION OF THE PREFERRED EMBODIMENTS

Figure 1:
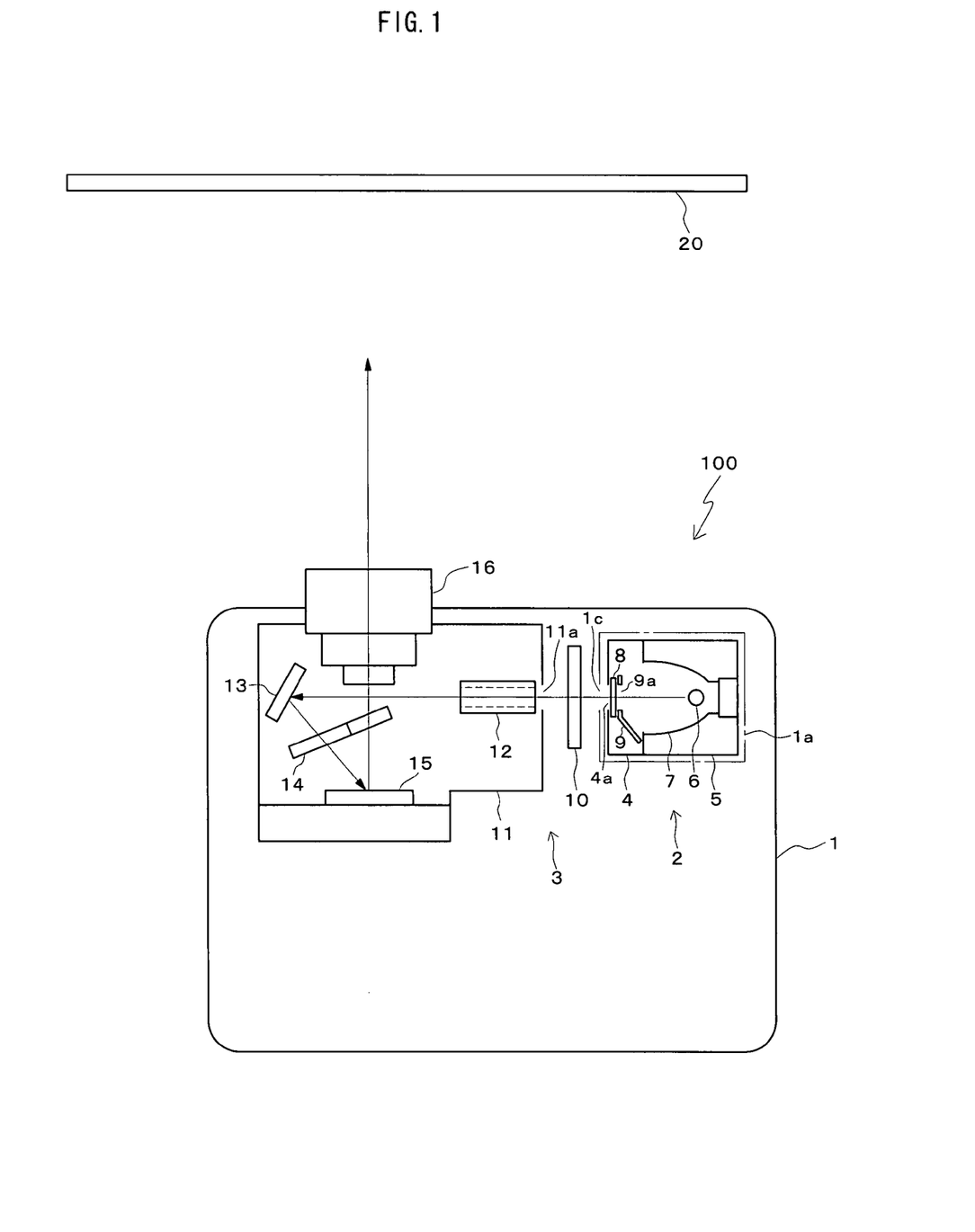
FIG. 1 is a structure diagram of a projector which is one example of a projection apparatus according to the present invention.
Figure 2:
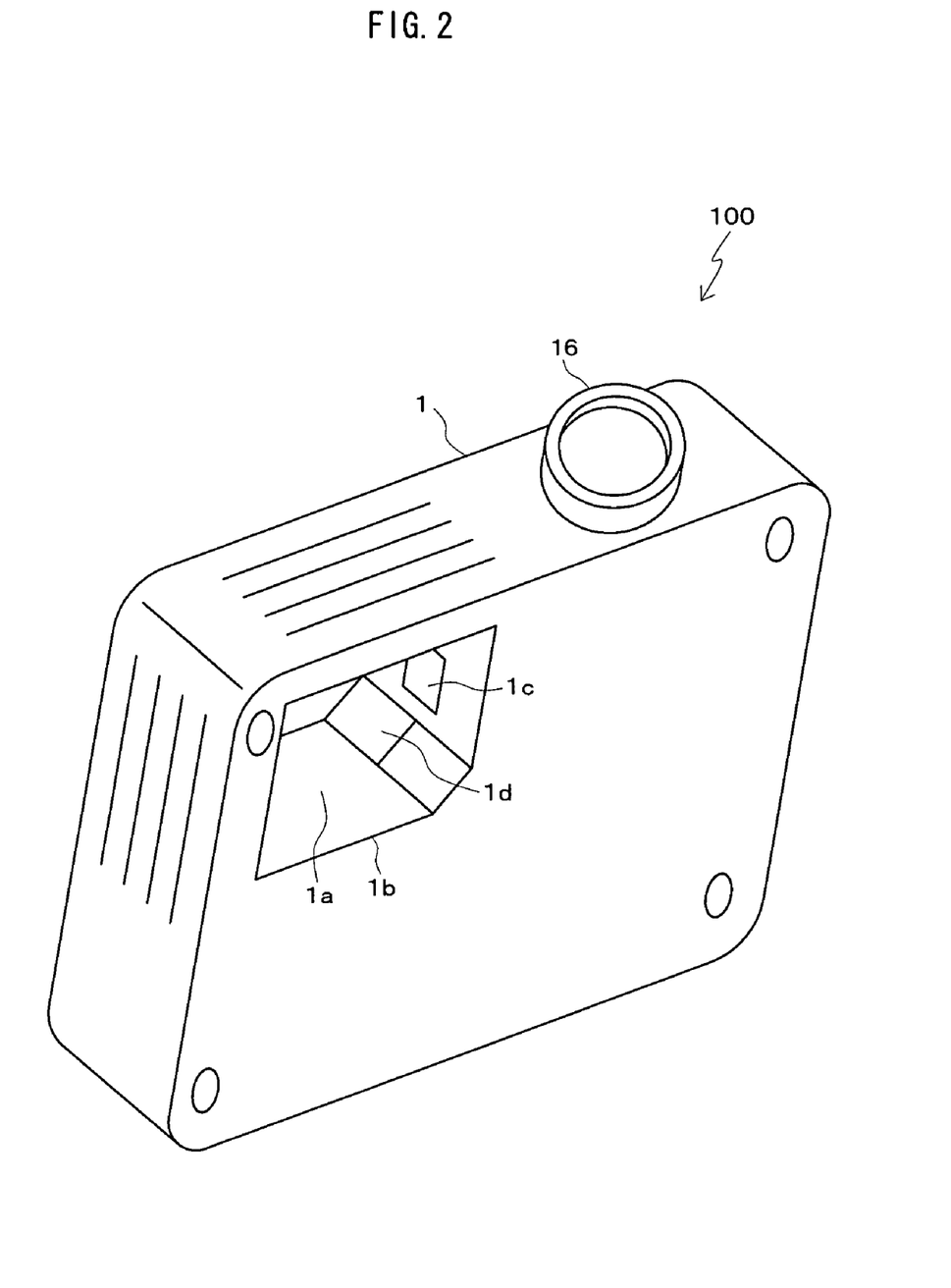
FIG. 2 is a perspective view when the projector is seen from beneath.

Hereinafter, referring to the drawings, embodiments of the present invention are described. FIG. 1 is a diagram showing a schematic structure of a projector 100, which is one example of a projection apparatus according to the present invention. FIG. 2 is a perspective view when the projector 100 is seen from beneath. The projector 100 is a single-plate type DLP (Digital Light Processing) projector. Inside of a body 1 of the projector 100, a light source unit 2 and an image projecting unit 3 are provided. Inside of the body 1, an air conditioning unit, a control unit, a power supply unit and the like, which are not shown, are provided as well.

The light source unit 2 is housed by a light source housing portion 1a provided in the body 1. In a bottom portion of the body 1, an opening 1b communicatively connecting to the light source housing portion 1a is provided, as shown in FIG. 2. The light source unit 2 is placed in the light source housing portion 1a or taken out of the light source housing portion 1a through the opening 1b. The opening 1b is closed by a lid not shown at the time other than the placement and the removal of the light source unit 2. In front of the light source housing portion 1a (image projecting unit 3 side), openings 1c, 1d are provided, respectively.

Reference numerals 4, 5 of FIG. 1 denote a front and rear division-type case of the light source unit 2, being formed of metal having heat resistance and high strength, such as aluminum. Reference numeral 4 denotes a front case and reference numeral 5 denotes a rear case. Reference numeral 6 denotes a lamp which is a light source, and reference numeral 7 denotes a reflector that reflects and collects light of the lamp 6. Inside of the rear case 5, the lamp 6 and the reflector 7 are arranged, and by fitting the rear case 5 and the front case 4 and fixing them by screws or the like, so that the front of the lamp 6 and the reflector 7 is covered with the front case 4, and the rear thereof is covered with the rear case 5, and the lamp 6 and the reflector 7 are held by the cases 4, 5. In the front case 4, an opening 4a allowing the light emitted from the lamp 6 to exit is provided. Reference numeral 8 denotes a cover glass attached to an inside of the front case 4 so as to close the opening 4a. The cover glass 8 is a substantially square, plate-like glass that passes visible light rays and the like and does not pass ultraviolet, and removes the ultraviolet from the light emitted from the lamp 6 while transmitting the light. Reference numeral 9 denotes an insulating member attached to the inside of the front case 4. The insulating member 9 is formed of synthetic resin having an insulating property, impact absorbing property, heat resistance, and high strength such as liquid crystal polyester resin (LCP). In the insulating member 9, an opening 9a allowing the light from the lamp 6 to exit is provided. The cover glass 8 is held by the front case 4 and the insulating member 9, as described later.

Reference numeral 10 denotes a color wheel made of a disc in which red, green, blue color filters are disposed alternately in a circumferential direction. The color wheel 10 is rotated by a motor not shown, and transmits white light emitted from the lamp 6 through any one of the color filters to separate into red light, green light and blue light. Reference numeral 11 denotes a vertically-division-type case of the image projecting unit 3, which is formed of metal such as aluminum. In a side surface on the light source unit 2 side of the case 11, an opening 11a allowing the light emitted from the lamp 6 and transmitting through the color wheel 10 to enter the inside is provided. Also, in the side surface of the case 11, the color wheel 10 is attached through an attaching member not shown. Inside of the case 11, parts for image projection 12 to 16 described below are attached.

Reference numeral 12 denotes a light tunnel whose inner surface is mirrored. The light tunnel 12 allows the light entering from an opening on one end side thereof to be repeatedly reflected inside and to exit through an opening on another end, thereby changing the light into condensed uniform light with a short light path length. Reference numeral 13 denotes a mirror that reflects the light passing through the light tunnel 12. Reference numeral 14 denotes a relay lens that aligns a light flux of the light reflected in the mirror 13. Reference numeral 15 denotes a DMD (Digital Micromirror Device) in which several hundreds of thousand of minute micromirrors (whose illustration is omitted) are integrated on a semiconductor memory, and a pixel is composed of the individual micromirror to which a memory cell is assigned. The DMD 15 is mounted on a circuit board not shown, and is cooled by a heat sink not shown. Each of the micromirrors of the DMD 15 is structured so as to be capable of tilting in two directions of ±12°, so that it is tilted in either of the directions by an electrostatic attraction in accordance with a memory value, and takes states of two values of ON/OFF by the tilting directions. Reference numeral 16 denotes a projection lens composed of an axially-telescopic cylinder, a plurality of lenses placed inside of the cylinder, and the like. The projection lens 16 transmits the light reflected in the DMD 15 to project it on a screen 20.

As indicated by arrow, the white light emitted from the lamp 6 passes through the opening 9a of the insulating member 9, and the ultraviolet is removed by the cover glass 8. The white light transmitting through the cover glass 8 passes through the opening 4a of the front case 4 and the opening 1c of the light source housing portion 1a, and transmits through any one of the color filters of the color wheel 10 to be separated into the red color, green color and blue color. The separated color light enters the inside through the opening 11a of the case 11, and passes through the light tunnel 12 to be condensed and uniformized. The light exiting the light tunnel 12 is reflected upward at a predetermined angle in the mirror 13, transmits through the relay lens 14, and is irradiated to the DMD 15. At this time, when the micromirror of the DMD 15 is in an ON state, the light reflected in the mirror is taken in by the projection lens 16 to be projected on the screen 20. When the micromirror is in an OFF state, the light reflected in the mirror is not taken in by the projection lens 16, so that it is not projected on the screen 20. That is, the projector 100 controls the operation state of the individual micromirror of the DMD 15 to turn ON/OFF, based on an inputted video signal or the like, thereby forming an image at the DMD 15 and projecting the image on the screen 20 through the projection lens 16.

Figure 3:
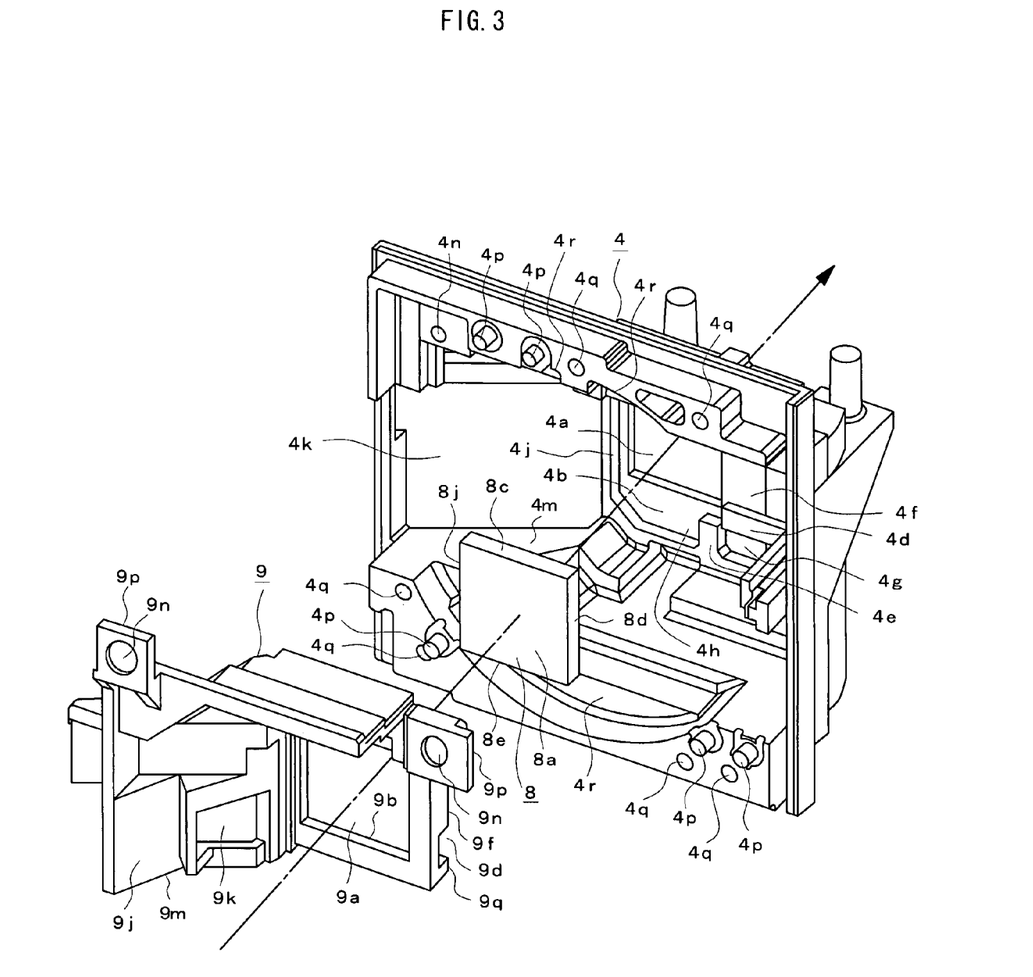
FIG. 3 is an exploded state view of a front case, a cover glass and an insulating member included in a light source unit of the projector.
Figure 4:
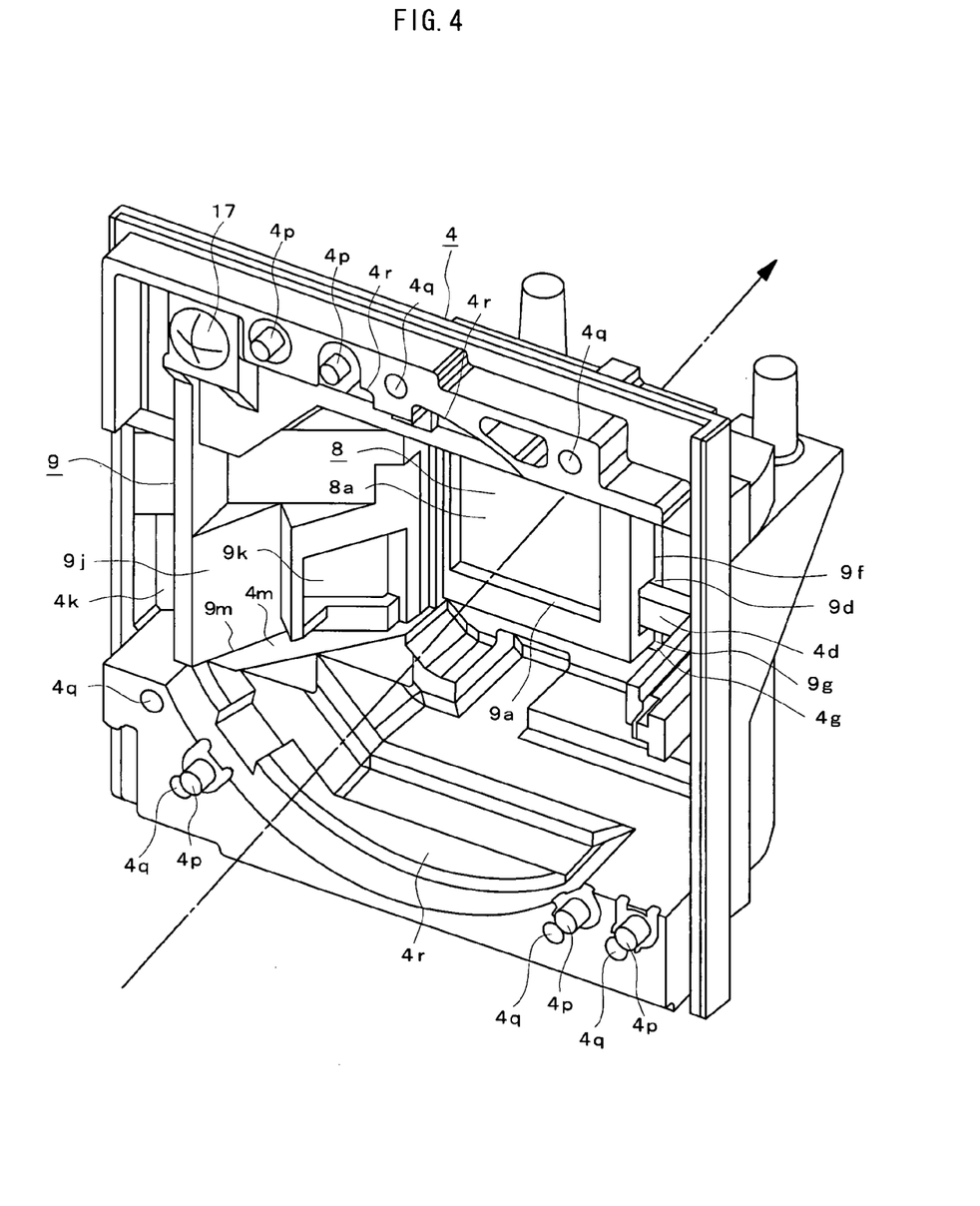
FIG. 4 is an attached state view of the front case, the cover glass and the insulating member.
Figure 5:
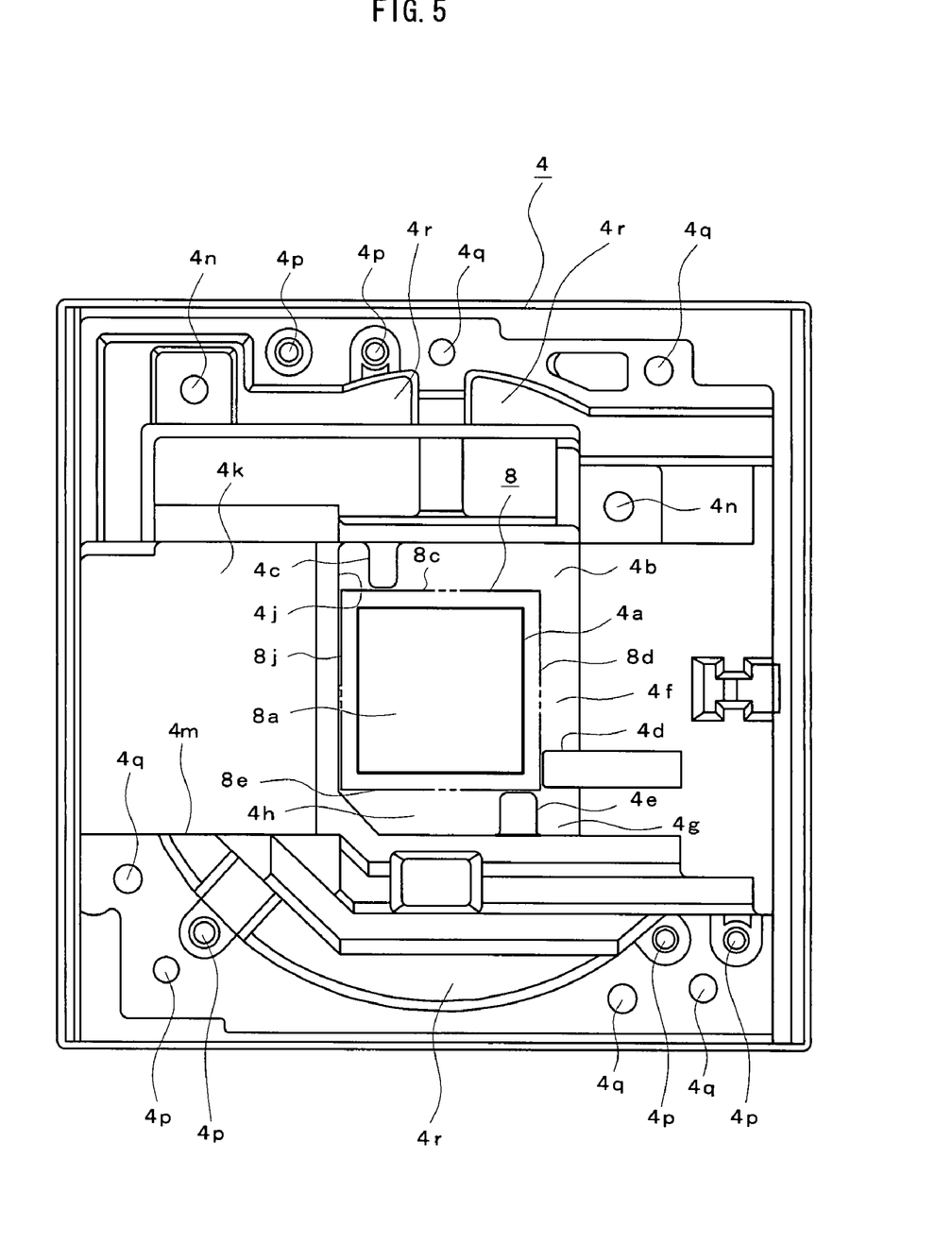
FIG. 5 is a front view of the front case.
Figure 6:
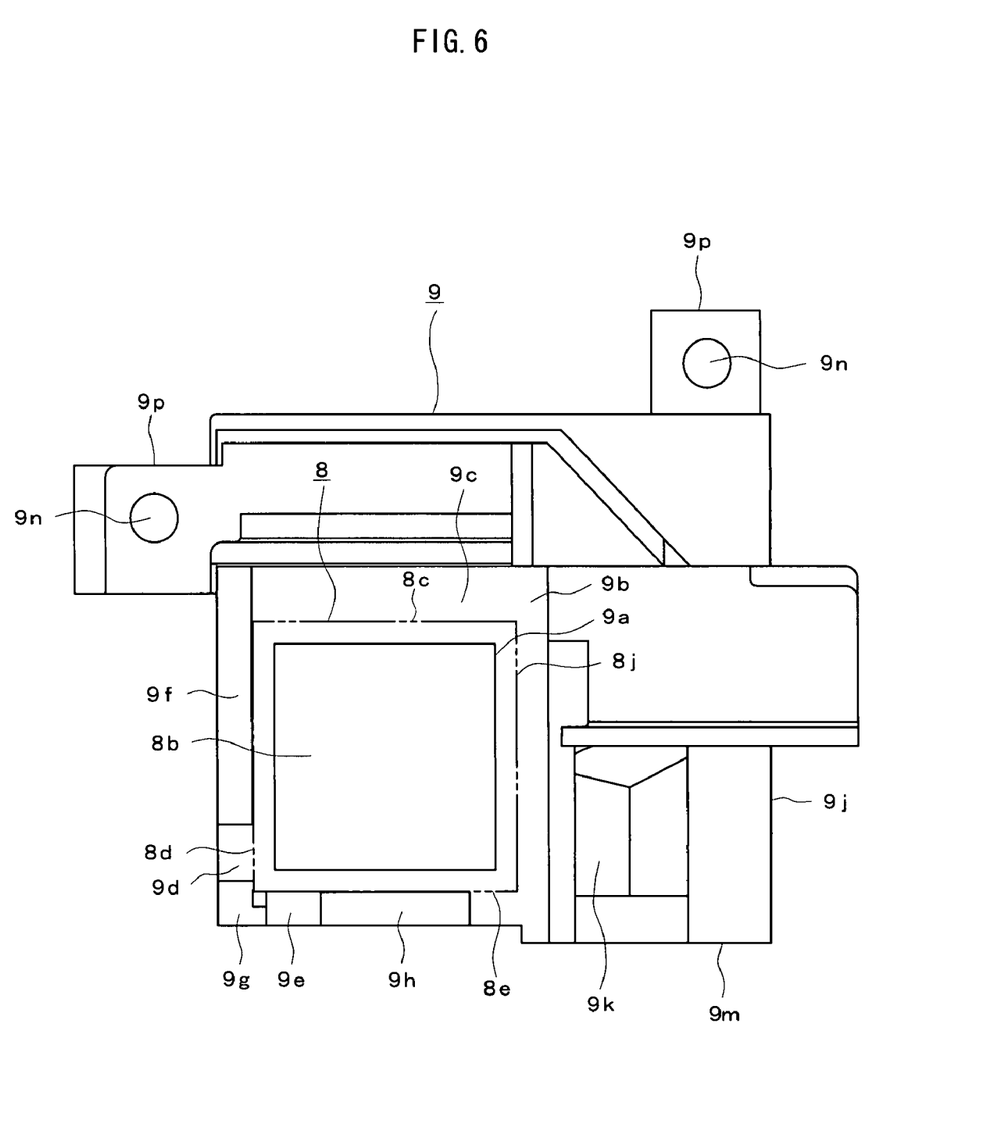
FIG. 6 is a front view of the insulating member.

FIG. 3 is a perspective view showing an exploded state of the front case 4, the cover glass 8, the insulating member 9 of the light source unit 2. FIG. 4 is a perspective view showing an attached state of the cover glass 8 and the insulating member 9 to the front case 4. FIG. 5 is a front view of the front case 4, showing a state seen from the insulating member 9 side in FIG. 3. FIG. 6 is a front view of the insulating member 9, showing a state seen from the front case 4 side in FIG. 3. In FIG. 3 and FIG. 4, an arrow represented by dot-dash line indicates an optical axis direction in which the light emitted from the lamp 6 advances. On the rear end side of the arrow (left obliquely downward in the figure), the above-described lamp 6, reflector 7 and rear case 5 are arranged, and on the tip end side (right obliquely upward in the figure), the above-described image projecting unit 3 is arranged.

The inside of the front case 4 is recessed, and in the center of the inside, the opening 4a allowing the light of the above-described lamp 6 to exit is formed. A fitting portion 4b into which the cover glass 8 is fitted as shown in FIG. 3 and FIG. 5 is formed around the opening 4a. The opening 4a is formed so as to be smaller than the cover glass 8. The fitting portion 4b is formed so as to be larger than the cover glass 8. In the fitting portion 4b, projected portions 4c, 4d, 4e and recessed portions 4f, 4g, 4h are partially provided. As shown in FIG. 5, in a state where the cover glass 8 is fitted into the fitting portion 4b, parts of end surfaces 8c, 8d, 8e perpendicular to surfaces 8a, 8b of the cover glass 8 that transmit the light (8b is a surface on the opposite side of 8a, and shown in FIG. 6) are supported by the projected portions 4c, 4d, 4e. Another end surface 8j of the cover glass 8 is supported by a side wall 4j of the fitting portion 4b.

At the side of the opening 4a of the front case 4, an opening 4k larger than the opening 4a is formed. In a lower end portion of the opening 4k, a supporting surface 4m that supports the insulating member 9 from beneath is formed. In an upper portion of the opening 4k and in an upper right portion of the opening 4a, screw holes 4n into which screws 17 (one is shown in FIG. 4) for attaching the insulting member 9 are screwed are formed. In an upper and lower end portions of the front case 4, bosses 4p into which the rear case 5 is fitted, and screw holes 4q into which screws not shown for joining the rear case 5 are screwed are formed. In the vicinity of the bosses 4p and the screw holes 4q, step portions 4r that support a tip end portion of the reflector 7 are formed.

The insulating member 9 is attached to the inside of the front case 4 by the screws 17 as shown in FIG. 4, and insulates vicinities of the openings 4a, 4k and a portion from the openings 4a, 4k to the upper step portion 4r and the screw holes 4n inside of the front case 4 so that current does not flow. A portion from the openings 4a, 4k to the lower step portion 4r and a portion from the opening 4a to an inner surface opposite the opening 4k inside of the front case 4 are also insulated by attaching another insulating member not shown. In this manner, in the case where the inside of the front case 4 is insulted by the insulating member 9 or the like, even if the lamp 6 is burst in the state where the light source unit 2 is assembled and incorporated into the body 1 as shown in FIG. 1, and a conductive member such as an electrode and a wire provided in the lamp 6, which are not shown, scatters forward from the reflector 7, the conductive member does not come into contact with the front case 4.

As shown in FIG. 3, in a front portion of the insulating member 9, the opening 9a allowing the light of the lamp 6 to exit is formed. A fitting portion 9b into which the cover glass 8 is fitted as shown in FIG. 6 is formed around the opening 9a on the front case 4 side. The opening 9a is formed so as to be smaller than the cover glass 8. The fitting portion 9b is formed so as to be larger than the cover glass 8. In the fitting portion 9b, projected portions 9f, 9g, 9h and recessed portions 9c, 9d, 9e are partially provided. In the state where the cover glass 8 is fitted into the fitting portion 9b as shown in FIG. 6, parts of the end surfaces 8d, 8e of the cover glass 8 are supported by the projected portions 9f, 9g, 9h. In the state where the insulating member 9 is attached to the front case 4 as shown in FIG. 4, the projected portions 4c, 4d, 4e of the front case 4 are fitted into the recessed portions 9c, 9d, 9e of the insulating member 9, respectively, and the projected portions 9f, 9g, 9h of the insulating member 9 are fitted into the recessed portions 4f, 4g, 4h of the front case 4, respectively. Moreover, the opening 4a of the front case 4 and the opening 9a of the insulating member 9 are communicatively connected. Furthermore, in the state where the light source unit 2 is incorporated into the body 1 as shown in FIG. 1, the openings 9a, 4a, and the opening 1c of the light source housing portion 1a are connected communicatively, so that the light of the lamp 6 enters the color wheel 10 through the openings 9a, 4a, 1a.

At the side of the opening 9a of the insulating member 9, an inclined wall 9j is formed as shown in FIG. 3 and the like. In a lower portion of the inclined wall 9j, an opening 9k smaller than the opening 4k of the front case 4 is formed. In the state where the insulating member 9 is attached to the front case 4 as shown in FIG. 4, the inclined wall 9j of the insulating member 9 has a lower surface 9m supported by the supporting surface 4m of the front case 4 to substantially cover the opening 4k. Moreover, the opening 9k of the insulating member 9 and the opening 4k of the front case 4 are communicatively connected. Furthermore, in the state where the light source unit 2 is incorporated into the body 1 as shown in FIG. 1, the openings 9k, 4k and the opening 1d (FIG. 2) of the light source housing portion 1a are communicatively connected, and wind caused to flow by a fan set up in the body 1, which is not shown, passes through the openings 1d, 4k, 9k to cool the light source unit 2. A flange portion 9p is formed above the opening 9a of the insulating member 9. In the flange 9p, a through-hole 9n that the screw 17 for attaching the insulating member 9 to the front case 4 penetrates is formed.

In the above-described constitution, in order to attach the cover glass 8 and the insulating member 9 to the front case 4, first, the portions of the end surfaces 8c, 8d, 8e of the cover glass 8 that are not supported by the projected portions 4c, 4d, 4e and the side wall 4j of the front case 4 are grasped by fingers or the like, and the cover glass 8 is fitted into the fitting portion 4b of the front case 4 as shown in FIG. 5. Next, in a state where the inside of the front case 4 is upturned so that the cover glass 8 does not drop off from the fitting portion 4b, the fitting portion 9b of the insulating member 9 is brought close to the fitting portion 4b, and the respective projected portions 4c, 4d, 4e of the front case 4 and the projected portions 9f, 9g, 9h of the insulating member 9 are fitted into the recessed portions 9c, 9d, 9e and the recessed portions 4f, 4g, 4h thereof, respectively. Then, the screws 17 are put through the trough-hole 9n of the insulating member 9 and are screwed into the screw holes 4n of the front case 4 to attach the insulating member 9 to the front case 4, as shown in FIG. 4. This allows the respective end surfaces 8c, 8d, 8e, 8j of the cover glass 8 to be supported by the respective projected portions 4c, 4d, 4e, 9f, 9g, 9h of the front case 4 and the insulting member 9, and the side wall 4j of the front case 4, and both the surfaces 8a, 8b of the cover glass 8 that transmit the light are sandwiched by the fitting portions 4b, 9b of the front case 4 and the insulating member 9 to fix the cover glass 8.

In this manner, since only by performing the fitting of the cover grass 8 into the fitting portion 4b of the front case 4 and the attachment of the insulating member 9 to the front case 4, the cover glass 8 is fixed, working processes are decreased in number, labors are reduced, time is shortened, and a member only for fixing the cover glass 8 does not need to be prepared. Therefore, the cover glass 8 can be attached to the front case 4 of the light source unit 2 easily and with a low cost. Particularly, the insulating member 9 formed of the synthetic resin can be manufactured with a cost lower than that of a member formed of sheet metal, which can further reduce the cost.

Moreover, since the cover glass 8 is sandwiched and fixed by the front case 4 made of metal and the insulating member 9 made of synthetic resin having an impact absorbing property, heat resistance and high strength, even if an impact is applied to the light source unit 2, for example, by dropping the light source unit 2 taken out of the light source housing portion 1a of the body 1 by mistake when the lamp 6 is exchanged, the impact can be absorbed by the insulating member 9 to prevent the cover glass 8 from being easily broken or dropping off. Additionally, the front case 4 and the insulating member 9 tolerate high heat when the lamp 6 emits light, which allows the fixed state of the cover glass 8 to be stably maintained. Furthermore, since the inside of the front case 4 is insulated by the insulating member 9 or the like, even if the conductive member such as the electrode or the wire of the lamp 6 scatters forward at the time of damage of the lamp 6 such as burst, it does not come into contact with the front case 4, which can prevent a short circuit or electric leak from occurring.

Moreover, in the structure where the entire end surfaces of the cover glass are supported by the side walls of the fitting portion of the explosion-proof cover as in the aforementioned Patent Document 4, fingers or the like touch the surfaces of the cover glass that transmit the light when the cover glass is fitted into the fitting portion, thereby contaminating or scratching the surface, so that light transmitting performance and ultraviolet removing performance are deteriorated. However, in the case where the projected portions 4c, 4d, 4e and the recessed portions 4f, 4g, 4h are partially provided in the fitting portion 4b of the front case 4 as described above, the portions of the end surfaces 8c, 8d, 8e of the cover glass 8 that are not supported by the projected portions 4c, 4d, 4e and the side wall 4j of the front case 4 can be grasped by the fingers or the like to fit the cover glass 8 into the fitting portion 4b without the fingers or the like touching the surfaces 8a, 8b of the cover glass 8 that transmit the light. Accordingly, deterioration in light transmitting performance and ultraviolet removing performance due to the contamination and scratching of the surfaces 8a, 8b can be prevented. Moreover, since the projected portions 9f, 9g, 9h and the recessed portions 9c, 9d, 9e are partially provided in the fitting portion 9b of the insulating member 9, the respective projected portions of the front case 4 and the insulating member 9 are fitted into the respective recessed portions thereof, so that wobbling of the insulating member 9 can be suppressed, and the insulating member 9 can be easily attached to the front case 4 by the screws 17. Furthermore, the cover glass 8 can be stably supported by the front case 4 and the insulating member 9 at not only the surfaces 8a, 8b that transmit the light but the end surfaces 8c, 8d, 8e, 8j, which can more effectively prevent the breaking and damage of the cover glass 8.

In the present invention, various forms other than the above-described embodiment can be employed. For example, while in the above-described embodiment, the example in which the cover glass 8 is fitted into the fitting portion 4b of the front case 4 to attach the insulating member 9 to the front case 4 is taken, the present invention is not limited only to this. In addition to this, the portions of the end surfaces 8c, 8d, 8e of the cover glass 8 that are not supported by the projected portions 9f, 9g, 9h of the insulating member 9 may be grasped by the fingers or the like to fit the cover glass 8 into the fitting portion 9b of the insulating member 9, and in a state where the fitting portion 9b side of the insulating member 9 is upturned so that the cover glass 8 does not drop off from the fitting portion 9b, the insulating member 9 may be attached to the front case 4. However, since the front case 4 is heavier than the insulating member 9, the procedure of attaching the insulating member 9 to the front case 4 in the state where the inside of the front case 4 is upturned is easier to attach the cover glass 4, and favorable in workability.

Moreover, while in the above-described embodiment, the example in which the lamp 6 is used as the light source is taken, the present invention is not limited only to this, but in addition to this, the present invention can also be applied to a case where an LED (Light Emitting Diode) is used as the light source.

Moreover, while in the above-described embodiment, the example in which the cover glass 8 having the ultraviolet removing function is attached to the front case 4 is taken, the present invention is not limited only to this, but the cover glass attached to the front case may be glass having not only the ultraviolet removing function but a scatter preventing function of broken pieces of the lamp, such as tempered glass.

Furthermore, while in the above-described embodiment, the example in which the substantially square, bore-shaped openings 4a, 9a are provided in the front case 4 and the insulating member 9 to set up the substantially square cover glass 8 between the openings 4a, 9a is taken, the present invention is not limited only to this. The shape of the openings provided for light exit in the front case and the insulating member may be rectangular, circular or the like, and particularly the opening provided in the insulating member is not limited to a bore but may be a notch or the like. Also, the shape of the cover glass is not limited to square, but may be rectangular, circular or the like.

Still further, while in the above-described embodiment, the example in which the present invention is applied to the single-plate type DLP projector 100 is taken, in addition to this, the present invention can be applied to a projection apparatus such as a three-plate type DLP projector using three DMDs as image forming parts and a liquid-crystal type projector using a liquid crystal panel, and a rear projection television, for example.

What is claimed is:

1. A projection apparatus comprising a light source unit comprising:
   a lamp;
   a plate-like cover glass that removes ultraviolet rays from light emitted from the lamp while transmitting the light; and
   a case that holds the lamp and the cover glass, the case comprising:
      a front case made of metal that covers a front of the lamp; and
      an insulating member made of synthetic resin and attachable to an inner side of the front case,
      wherein the projection apparatus forms and projects an image using the light exiting the light unit source unit,
      wherein the front case and the insulating member each comprise:
         an opening that allows the light emitted from the lamp to exit; and a fitting portion into which the cover glass is fitted, the fitting portion being provided around the opening and comprising:
- a plurality of projected portions that support a part of end surfaces of the cover glass; and
- a plurality of recessed portions into which the projected portions are respectively fitted, wherein the cover glass is fitted into the fitting portion of the front case, and wherein the respective projected portions of the front case and the insulating member are fitted into the respective recessed portions thereof to attach the insulating member to the front case so that the cover glass is supported by the respective projected portions and is sandwiched and fixed by the front case and the insulating member.

2. The projection apparatus according to claim 1, wherein the case further comprises a rear case that is fixable to the front case such that a front of the lamp is covered with the front case and the rear of the lamp is covered with the rear case.

3. A projection apparatus comprising a light source unit comprising:
- a light source;
- a cover glass that transmits light emitted from the light source; and
- a case that holds the light source and the cover glass, the case comprising:
  - a front case made of metal that covers a front of the light source; and
  - an insulating member attachable to an inner side of the front case, wherein the projection apparatus forms and projects an image using the light exiting the light unit source unit, the front case and the insulating member each comprise:
- an opening that allows the light emitted from the light source to exit; and
- a fitting portion into which the cover glass is fitted, the fitting portion being provided around the opening, and wherein the cover glass is fitted into one of the fitting portions to attach the insulating member to the front case so that the cover glass is sandwiched and fixed by the front case and the insulating member.

4. The projection apparatus according to claim 3, wherein the fitting portion of the front case and the fitting portion of the insulating member each comprise:
- projected portions that support a part of end surfaces of the cover glass; and
- recessed portions into which the projected portions are respectively fitted.

* * * * *